(12) United States Patent
    Saita

(10) Patent No.: US 11,742,142 B2
(45) Date of Patent: Aug. 29, 2023

(54) CAPACITOR COMPONENT

(71) Applicant: TDK CORPORATION, Tokyo (JP)

(72) Inventor: Hitoshi Saita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/581,060

(22) Filed: Jan. 21, 2022

(65) Prior Publication Data

US 2022/0254566 A1    Aug. 11, 2022

(30) Foreign Application Priority Data

Feb. 9, 2021    (JP) .................................. 2021-018838

(51) Int. Cl.
    *H01G 2/16*    (2006.01)
    *H01G 4/005*    (2006.01)
    *H01G 4/228*    (2006.01)

(52) U.S. Cl.
    CPC .............. *H01G 2/16* (2013.01); *H01G 4/005* (2013.01); *H01G 4/228* (2013.01)

(58) Field of Classification Search
    CPC ........ H01G 2/005; H01G 4/228; H01G 4/232; H01G 2/16
    See application file for complete search history.

(56) References Cited

U.S. PATENT DOCUMENTS

2014/0022696 A1    1/2014  Banno et al.

FOREIGN PATENT DOCUMENTS

| JP | 63305505 A | * | 12/1988 | ............... H01G 2/14 |
|----|------------|---|---------|--------------------------|
| JP | 64469008 A | * | 3/1989  |                          |
| JP | 05-001218 U |   | 1/1993  |                          |
| JP | 05251266 A | * | 9/1993  |                          |
| JP | 08017672 A | * | 1/1996  |                          |
| JP | 11087614 A | * | 3/1999  |                          |
| JP | H11340087 A |   | 12/1999 |                          |
| JP | 2017112393 A |  | 6/2017  |                          |
| JP | 2018082067 A |  | 5/2018  |                          |
| WO | 2012132684 A1 | | 7/2014  |                          |

* cited by examiner

*Primary Examiner* — Eric W Thomas
(74) *Attorney, Agent, or Firm* — YOUNG LAW FIRM, P.C.

(57) ABSTRACT

Disclosed herein is a capacitor component that includes a lower electrode, a capacitive insulating film covering the lower electrode, a plurality of upper electrodes overlapping the lower electrode through the capacitive insulating film, a first external terminal connected to the lower electrode, a plurality of fuse wires connected respectively to the plurality of upper electrodes, and a second external terminal connected in common to the plurality of fuse wires. The resistance values of the plurality of respective fuse wires are higher than the resistance values of the plurality of corresponding upper electrodes.

4 Claims, 6 Drawing Sheets

CAPACITOR COMPONENT

BACKGROUND OF THE INVENTION

Field of the Invention

The present invention relates to a capacitor component and, more particularly, to a capacitor component capable of self-repairing a short circuit defect due to dielectric breakdown of a capacitive insulating film.

Description of Related Art

A chip-type capacitor component mounted on, e.g., a printed circuit board may experience a short circuit defect between upper and lower electrodes due to dielectric breakdown of a capacitive insulating film. To cope with this, there is proposed a chip component incorporating a fuse mechanism for self-repair of the short circuit defect.

For example, International Patent Publication WO 2012/132684 proposes a capacitor component having a narrow portion in each of upper and lower electrodes, the narrow portion being cut when a short circuit defect occurs. JP H11-340087A proposes a capacitor component having an element portion or a narrow portion having a fuse function between each of upper and lower electrodes and an external terminal, the element and narrow portions being cut when a short circuit defect occurs. JP 2018-082067A proposes a capacitor component having a fuse part that is dielectrically broken down more easily, the fuse part being broken when an abnormal voltage is applied. JP H05-001218U proposes a capacitor component having a structure in which an external terminal and a capacitive element are connected by a fuse wire. Further, although not directly related to the fuse mechanism, JP 2017-112393A proposes a capacitor component wherein the capacitance value thereof is made variable by laser trimming.

However, in the capacitor components described in International Patent Publication WO 2012/132684, JP H11-340087A, and JP 2017-112393A, the fuse part or trimming part is provided on a capacitive insulating film, so that when the fuse part or trimming part is cut due to heat, the capacitive insulating film is damaged. In the capacitor component described in JP 2018-082067A, the fuse part and capacitor part are connected in parallel, which structure could fail to achieve self-repair when a short circuit defect occurs in the capacitor part. Further, the capacitor component described in JP H05-001218U will not function as a capacitor when the fuse wire is cut.

SUMMARY

It is therefore an object of the present invention to provide a capacitor component capable of self-repairing a short circuit defect without damaging a capacitive insulating film.

A capacitor component according to the present invention includes: a lower electrode; a capacitive insulating film covering the lower electrode; a plurality of upper electrodes overlapping the lower electrode through the capacitive insulating film; a first external terminal connected to the lower electrode; a plurality of fuse wires connected respectively to the plurality of upper electrodes; and a second external terminal connected in common to the plurality of fuse wires. The resistance values of the plurality of respective fuse wires are higher than the resistance values of the plurality of corresponding upper electrodes.

According to the present invention, the upper electrode is divided into a plurality of electrodes, so that even when a part of the capacitive insulating film is dielectrically broken down, a short circuit defect can be self-repaired by separating only the upper electrode in the part where the dielectric breakdown has occurred. In addition, the fuse wires are assigned respectively to the plurality of upper electrodes, so that the fuse wire is cut without involving the cutting of the upper electrode itself contacting the capacitive insulating film, and this prevents the capacitive insulating film from being damaged.

In the present invention, the plurality of fuse wires may be made of a conductive material different from that of the plurality of upper electrodes. This arrangement makes it possible to constitute fuse wires that can be easily cut at the time when a short circuit defect occurs.

In the present invention, the plurality of fuse wires may each include a wiring pattern disposed above each of the plurality of upper electrodes through an insulating layer and a via conductor penetrating the insulating layer and connecting one of the plurality of upper electrodes and its corresponding wiring pattern. This can increase the resistance value of the fuse wire.

In the present invention, the plurality of fuse wires may each include a first section in which current flows in a first direction and a second section disposed in close vicinity of the first section and in which current flows in a second direction opposite to the first direction. This can reduce the self-inductance of the fuse wires.

In the present invention, the plurality of lower electrodes and the plurality of upper electrode layers each having the plurality of upper electrodes may be alternately stacked via the capacitive insulating film. This allows a larger capacitance to be obtained.

As described above, according to the present invention, there can be provided a capacitor component capable of self-repairing a short circuit defect without damaging a capacitive insulating film.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

First Embodiment

Figure 1:
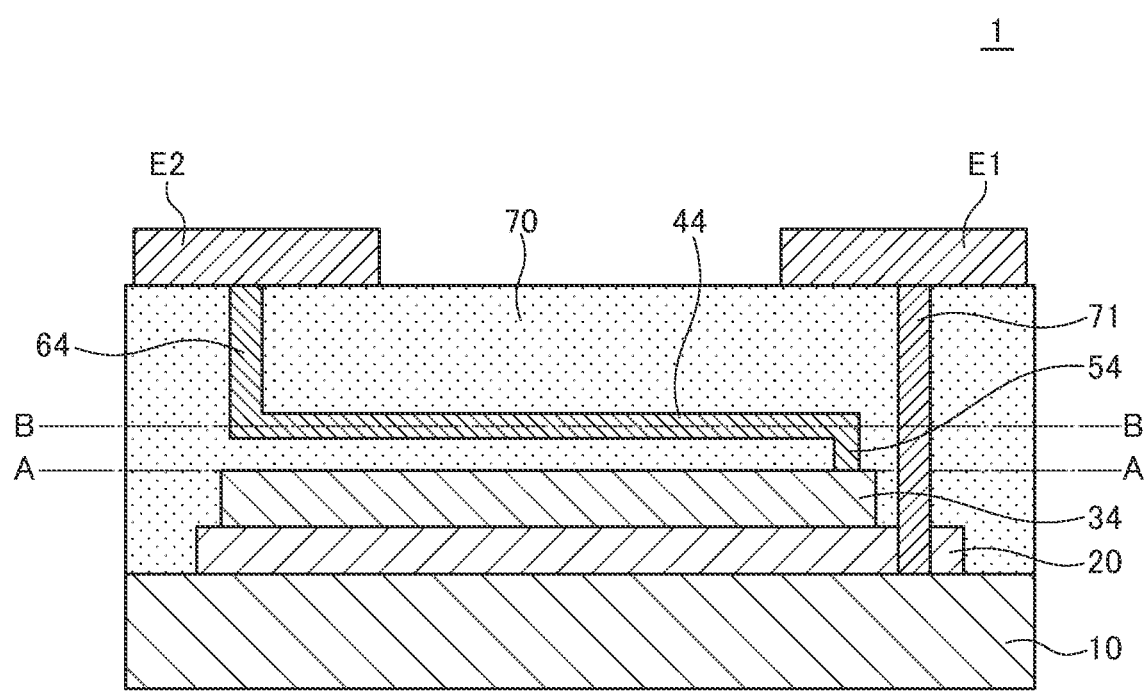
FIG. 1 is a schematic cross-sectional view for explaining the structure of a capacitor component 1 according to a first embodiment of the present invention.
Figure 2A:
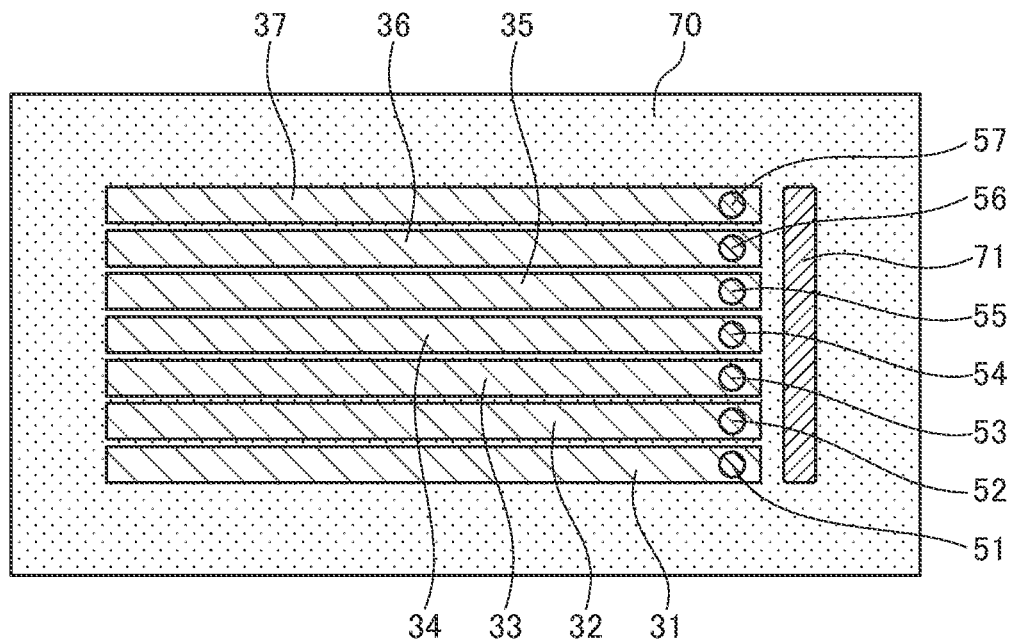
FIG. 2A is a schematic plan view along the line A-A in FIG. 1.
Figure 2B:
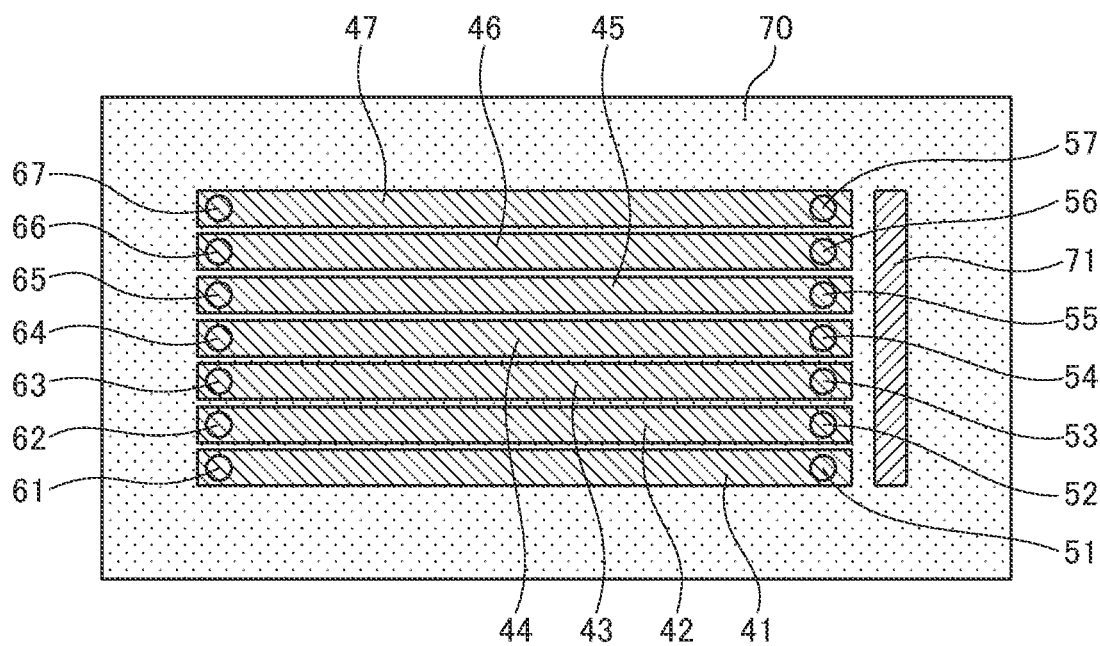
FIG. 2B is a schematic plan view along the line B-B in FIG. 1.

FIG. 1 is a schematic cross-sectional view for explaining the structure of a capacitor component 1 according to a first embodiment of the present invention. FIG. 2A is a schematic plan view along the line A-A in FIG. 1, and FIG. 2B is a schematic plan view along the line B-B in FIG. 1.

The capacitor component 1 according to the present embodiment is a chip-type electronic component that can be surface-mounted on a circuit board and can be used as a smoothing capacitor or a snubber capacitor for a switching circuit. As illustrated in FIGS. 1 and 2, the capacitor component 1 includes a lower electrode 10, a capacitive insulating film 20 covering the lower electrode 10, and upper electrodes 31 to 37 overlapping the lower electrode 10 through the capacitive insulating film 20. The lower electrode 10 serves as a base material of the capacitor component 1 according to the present embodiment and can be made of a metal material such as Ni. Examples of the material of the capacitive insulating film 20 include, but not limited thereto, $BaTiO_3$, $Ba(Mg_{1/3}Ta_{2/3})O_3$, NiO, CuO, $Al_2O_3$, $Fe_2O_3$, and $SiO_2$. The upper electrodes 31 to 37 are constituted by a seven-segment strip conductor pattern and are positioned in the same conductor layer. As the material of the upper electrodes 31 to 37, a metal material having a low resistance value, such as Cu, is used. The capacitive insulating film 20 and upper electrodes 31 to 37 are covered with an insulating layer 70 made of resin or the like. The insulating layer 70 has a multilayer structure and includes a wiring pattern and the like embedded therein.

The lower electrode 10 is connected to an external terminal E1 through a via conductor 71 penetrating the insulating layer 70. The upper electrodes 31 to 37 are connected in common to an external terminal E2 through via conductors 51 to 57, wiring patterns 41 to 47, and via conductors 61 to 67, respectively. The wiring patterns 41 to 47 and via conductors 51 to 57, 61 to 67 constitute seven fuse wires corresponding respectively to the upper electrodes 31 to 37. The via conductors 51 to 57 connect one ends of the wiring patterns 41 to 47 and their corresponding upper electrodes 31 to 37, and the via conductors 61 to 67 connect the other ends of the wiring patterns 41 to 47 and the external terminal E2.

The resistance values of the respective fuse wires are designed to be higher than the resistance values of the respective upper electrodes 31 to 37. Such a design can be achieved by using, as the material of the wiring patterns 41 to 47, one (Ni, Al, W, Ta, etc.) having a resistivity higher than that of Cu which is the material of the upper electrodes 31 to 37, by making the sectional areas of the wiring patterns 41 to 47 smaller than those of the upper electrodes 31 to 37, by forming a narrow portion in part of the wiring patterns 41 to 47, by reducing the diameters of the via conductors 51 to 57, 61 to 67, or the like.

Thus, even when an abnormally high voltage is applied between the external terminals E1 and E2 to cause a part of the capacitive insulating film 20 to be dielectrically broken down, any of the fuse wires is fused by a large current that flows in the part where the dielectric breakdown has occurred. For example, when dielectric breakdown has occurred in a portion covered with the upper electrode 34, any portion of the fuse wire constituted by the wiring pattern 44 and via conductors 54 and 64 is fused. This electrically separates the upper electrode 34 from the other upper electrodes 31 to 33, 35 to 37. As a result, the upper electrode 34 in which a short circuit defect has occurred fails to function as a capacitive electrode; however, the other upper electrodes 31 to 33, 35 to 37 normally function, so that the entire capacitor component 1 is self-repaired. In addition, since the fuse wires are embedded in the insulating layer 70 having a multilayer structure, the capacitive insulating film 20 is not damaged due to fusing.

Second Embodiment

Figure 3:
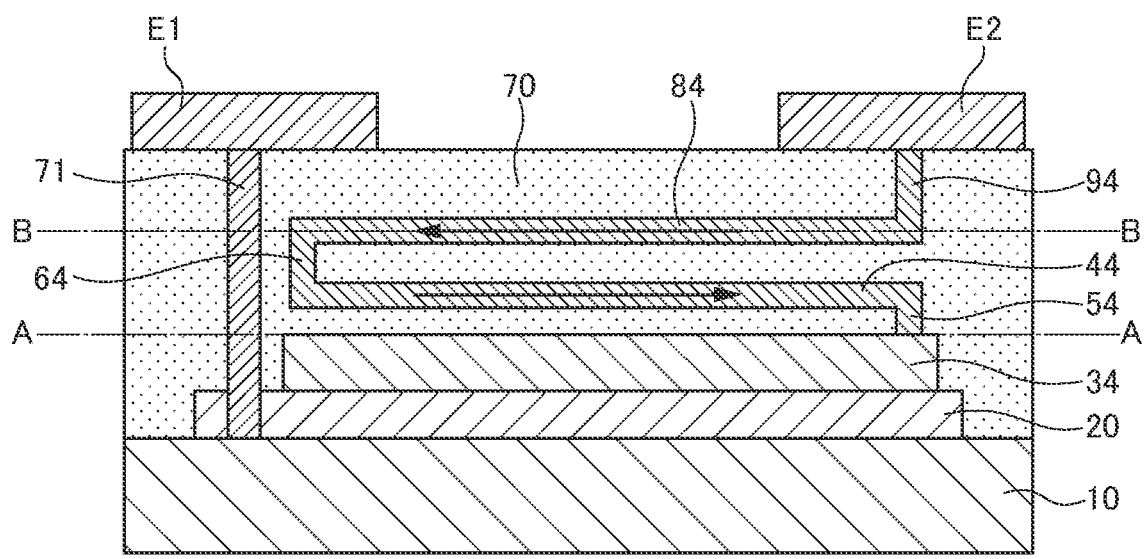
FIG. 3 is a schematic cross-sectional view for explaining the structure of a capacitor component 2 according to a second embodiment of the present invention.
Figure 4A:
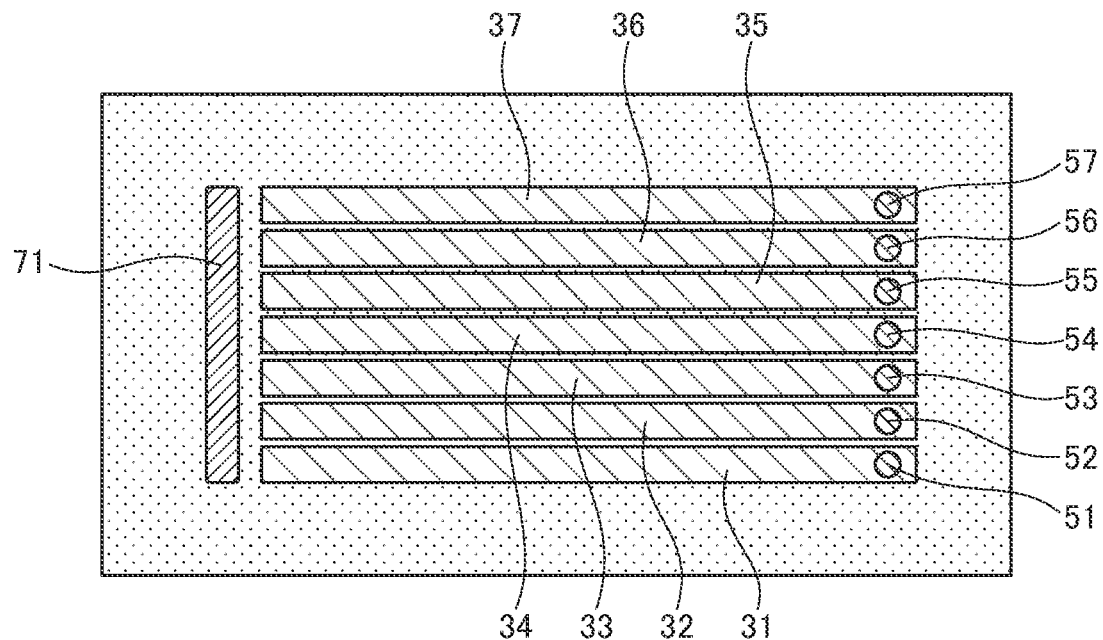
FIG. 4A is a schematic plan view along the line A-A in FIG. 3.
Figure 4B:
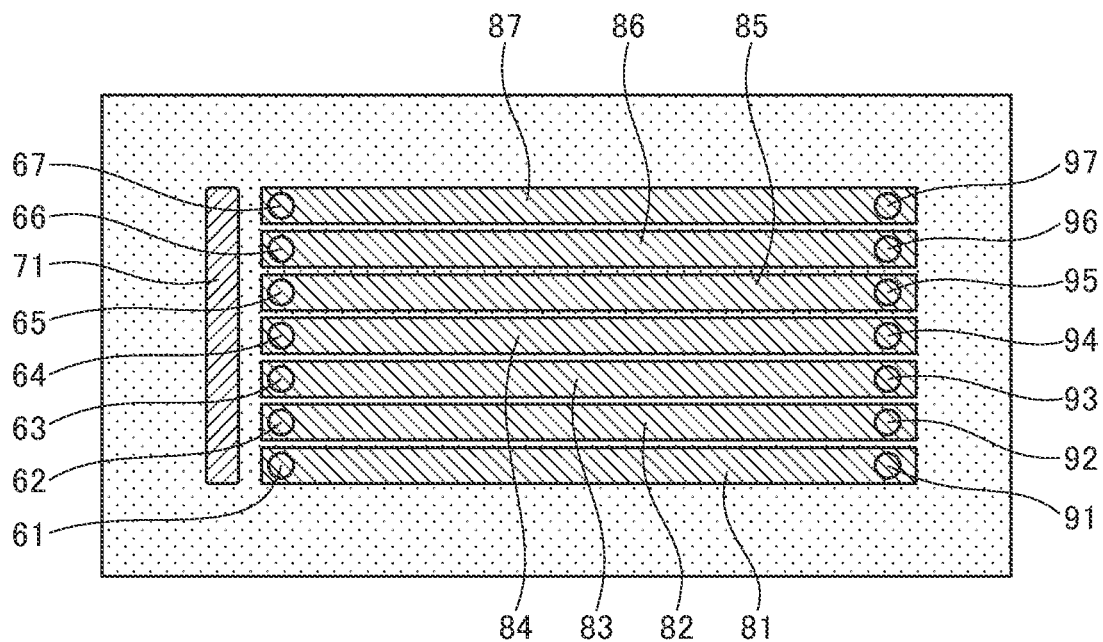
FIG. 4B is a schematic plan view along the line B-B in FIG. 3.

FIG. 3 is a schematic cross-sectional view for explaining the structure of a capacitor component 2 according to a second embodiment of the present invention. FIG. 4A is a schematic plan view along the line A-A in FIG. 3, and FIG. 4B is a schematic plan view along the line B-B in FIG. 3.

The capacitor component 2 according to the second embodiment differs from the capacitor component 1 according to the first embodiment in that it additionally includes, as the fuse wires, wiring patterns 81 to 87 and via conductors 91 to 94. Other basic configurations are the same as those of the capacitor component 1 according to the first embodiment, so the same reference numerals are given to the same elements, and overlapping description will be omitted.

The wiring patterns 81 to 87 each constitute parts of the respective fuse wires arranged in close vicinity to the wiring patterns 41 to 47 so as to overlap them. The via conductors 61 to 67 connect the other ends of the wiring patterns 41 to 47 and one ends of the wiring patterns 81 to 87, and the via conductors 91 to 97 connect the other ends of the wiring patterns 81 to 87 and the external terminal E2.

With the above configuration, currents flow in mutually opposite directions in the wiring patterns 41 to 47 and wiring patterns 81 to 87, so that a magnetic field generated by the wiring patterns 41 to 47 and a magnetic field generated by the wiring patterns 81 to 87 cancel each other. This reduces the self-inductances of the wiring patterns 41 to 47 and 81 to 87. Although the wiring patterns 41 to 47 and wiring patterns 81 to 87 are disposed adjacent in the stacking direction in the present embodiment, they may be formed in the same conductor layer and disposed adjacent in a planar direction.

Third Embodiment

Figure 5:
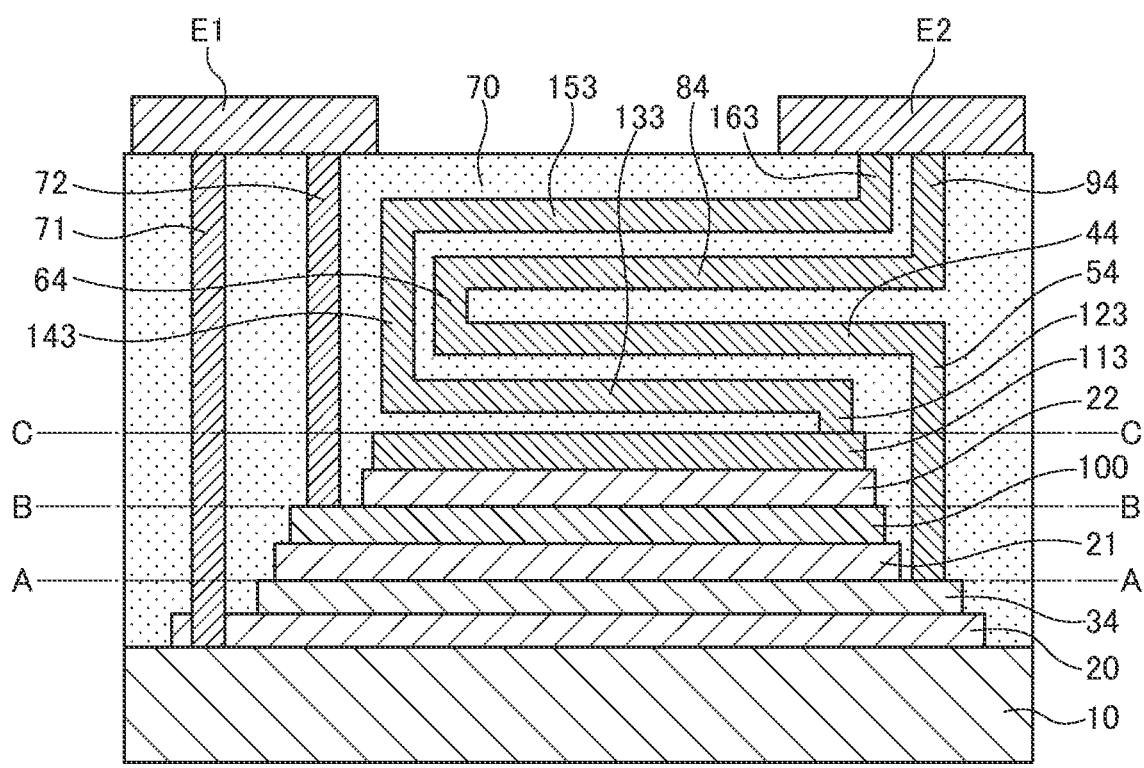
FIG. 5 is a schematic cross-sectional view for explaining the structure of a capacitor component 3 according to a third embodiment of the present invention.
Figure 6A:
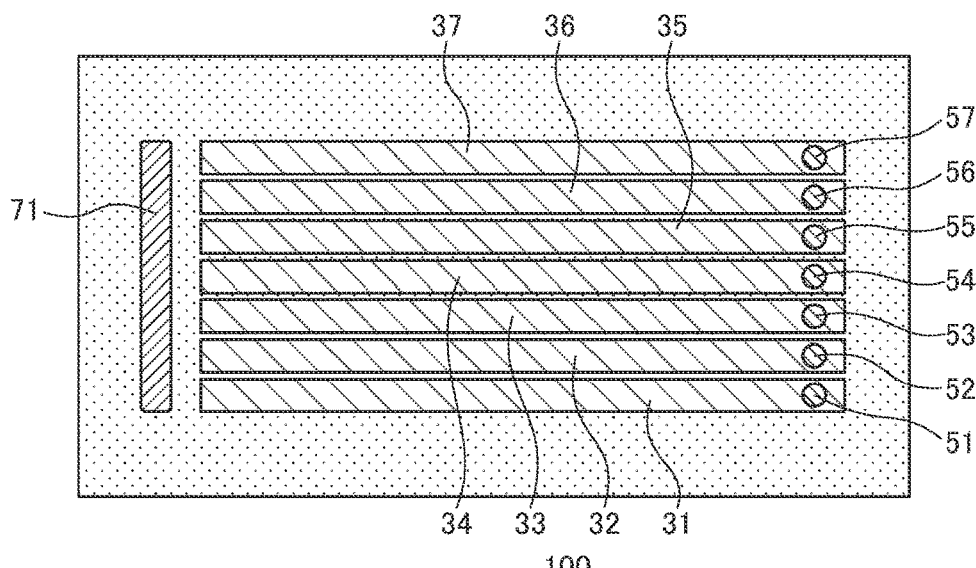
FIG. 6A is a schematic plan view along the line A-A in FIG. 5.
Figure 6B:
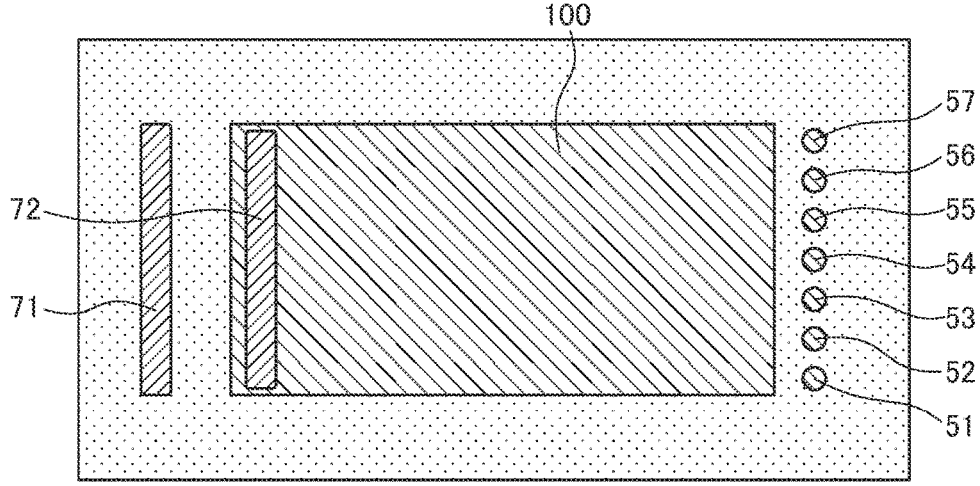
FIG. 6B is a schematic plan view along the line B-B in FIG. 5.
Figure 6C:
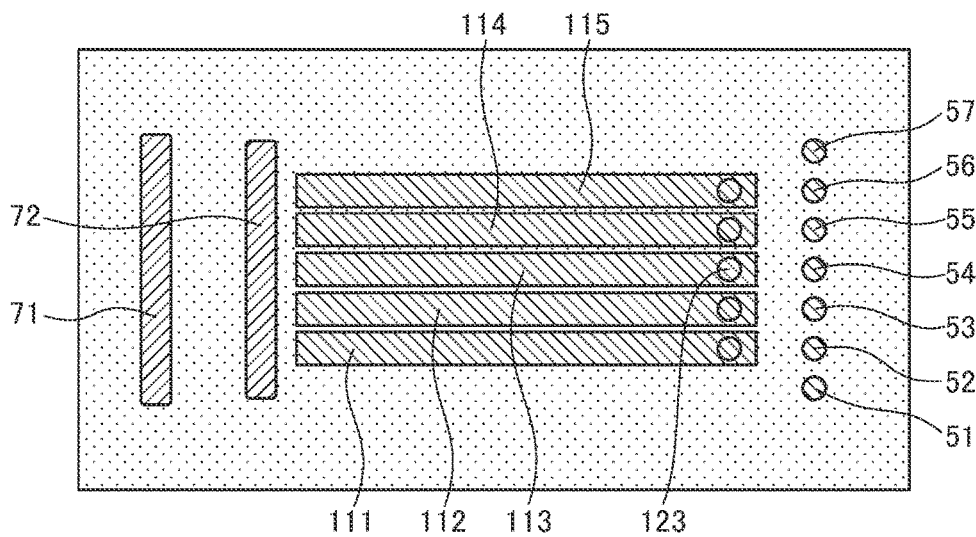
FIG. 6C is a schematic plan view along the line C-C in FIG. 5.

FIG. 5 is a schematic cross-sectional view for explaining the structure of a capacitor component 3 according to a third embodiment of the present invention. FIG. 6A is a schematic plan view along the line A-A in FIG. 5, FIG. 6B is a schematic plan view along the line B-B in FIG. 5, and FIG. 6C is a schematic plan view along the line C-C in FIG. 5.

The capacitor component 3 according to the third embodiment differs from the capacitor component 2 according to the second embodiment in that lower electrodes 10 and 100, an upper electrode layer including the upper electrodes 31 to 37, and an upper electrode layer including upper electrodes 111 to 115 are alternately stacked through capacitive insulating films 20 to 22. Other basic configurations are the same as those of the capacitor component 2 according to the second embodiment, so the same reference numerals are given to the same elements, and overlapping description will be omitted.

As illustrated in FIGS. 5 and 6, the upper electrode layer including the upper electrodes 31 to 37 is covered with the lower electrode 100 through the capacitive insulating film 21. The lower electrode 100 is connected to the external terminal E1 through a via conductor 72 penetrating the insulating layer 70. The lower electrode 100 is covered with the upper electrode layer including the upper electrodes 111 to 115 through the capacitive insulating film 22. The upper electrodes 111 to 115 are connected in common to the external terminal E2 through their corresponding fuse wires. For example, the upper electrode 113 is connected to the external terminal E2 through a via conductor 123, a wiring pattern 133, a via conductor 143, a wiring pattern 153, and a via conductor 163. The same applies to the other upper electrodes 111, 112, 114, and 115.

Thus, when the plurality of lower electrodes and the plurality of upper electrodes are stacked through the capacitive insulating films, a larger capacitance can be obtained.

While the preferred embodiment of the present invention has been described, the present invention is not limited to the above embodiment, and various modifications may be made within the scope of the present invention, and all such modifications are included in the present invention.

For example, although the plurality of upper electrodes are constituted by strip conductive patterns in the above respective embodiments, the upper electrodes need not have a strip shape, but may have any shape as long as they are insulated from each other in the conductor layer in which they are formed. Further, the "lower electrode" and "upper electrode" are only relative terms and do not indicate the positional relation therebetween.

What is claimed is:

1. A capacitor component comprising:
   a lower electrode;
   a capacitive insulating film covering the lower electrode;
   a plurality of upper electrodes overlapping the lower electrode through the capacitive insulating film;
   a first external terminal connected to the lower electrode;
   a plurality of fuse wires connected respectively to the plurality of upper electrodes; and
   a second external terminal connected in common to the plurality of fuse wires,
   wherein resistance values of the plurality of respective fuse wires are higher than resistance values of the plurality of corresponding upper electrodes, and
   wherein each of the plurality of fuse wires includes:
   a first section in which current flows in a first direction; and
   a second section disposed in close vicinity of the first section and in which current flows in a second direction opposite to the first direction.

2. The capacitor component as claimed in claim 1, wherein the plurality of fuse wires comprise a conductive material different from that of the plurality of upper electrodes.

3. The capacitor component as claimed in claim 1, wherein each of the plurality of fuse wires includes:
   a wiring pattern disposed above an associated one of the plurality of upper electrodes through an insulating layer; and
   a via conductor penetrating the insulating layer and connecting the associated one of the plurality of upper electrodes and the wiring pattern.

4. The capacitor component as claimed in claim 1, wherein a plurality of the lower electrodes and a plurality of upper electrode layers each having the plurality of upper electrodes are alternately stacked via the capacitive insulating film.

* * * * *